United States Patent
Venkatraman et al.

(10) Patent No.: US 10,254,188 B2
(45) Date of Patent: Apr. 9, 2019

(54) ADAPTIVE PRESSURE SENSOR SAMPLING RATE

(71) Applicant: QUALCOMM Incorporated, San Diego, CA (US)

(72) Inventors: Sai Pradeep Venkatraman, Santa Clara, CA (US); Gengsheng Zhang, Cupertino, CA (US); Arnold Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 15/260,624

(22) Filed: Sep. 9, 2016

(65) Prior Publication Data

US 2018/0073951 A1 Mar. 15, 2018

(51) Int. Cl.
| | |
|---|---|
| *G01L 27/00* | (2006.01) |
| *G01C 5/06* | (2006.01) |
| *G01C 21/16* | (2006.01) |
| *G01C 25/00* | (2006.01) |
| *H04W 4/02* | (2018.01) |
| *H04W 64/00* | (2009.01) |

(Continued)

(52) U.S. Cl.
CPC ............ *G01L 27/002* (2013.01); *G01C 5/06* (2013.01); *G01C 21/165* (2013.01); *G01C 25/00* (2013.01); *G01L 27/005* (2013.01); *H04W 4/023* (2013.01); *H04W 4/025* (2013.01); *H04W 4/33* (2018.02); *H04W 64/00* (2013.01); *G01P 13/00* (2013.01)

(58) Field of Classification Search
CPC ....... G01L 27/002; G01L 27/005; G01C 5/06; G01C 21/165; G01C 25/00; H04W 4/04; G01P 13/00

USPC ........................... 73/1.57, 1.59, 1.66; 702/98
See application file for complete search history.

(56) References Cited

U.S. PATENT DOCUMENTS

| | | | |
|---|---|---|---|
| 7,637,141 B2 * | 12/2009 | O'Neill | G01C 25/00 73/1.59 |
| 8,712,713 B2 | 4/2014 | Wolf et al. | |
| 2002/0016694 A1 | 2/2002 | Tsuji | |

(Continued)

FOREIGN PATENT DOCUMENTS

| | | |
|---|---|---|
| EP | 0996004 B1 | 6/2006 |
| JP | H08261755 A | 10/1996 |

(Continued)

OTHER PUBLICATIONS

International Search Report and Written Opinion—PCT/US2017/040036—ISA/EPO—dated Sep. 14, 2017.

*Primary Examiner* — Robert R Raevis
(74) *Attorney, Agent, or Firm* — Kilpatrick Townsend & Stockton (57) ABSTRACT

Techniques provided herein are directed toward adjusting the rate at which a mobile device's barometric pressure sensor takes measurements, based on whether movement is detected from motion sensors, such as accelerometers, gyroscopes, and the like. Where movement is below a threshold (e.g., below a threshold speed or within a threshold distance), then the barometric pressure sensor can reduce the sampling rate to a rate that still enables the mobile device to account for changes in the weather. If movement is detected (e.g., greater than a threshold distance), then the sampling rate of the barometric pressure sensor increases (i.e., to a normal rate for determining vertical movement changes).

27 Claims, 7 Drawing Sheets

(51) Int. Cl.
*H04W 4/33* (2018.01)
*G01P 13/00* (2006.01)

(56) References Cited

U.S. PATENT DOCUMENTS

| | | |
|---|---|---|
| 2012/0083705 A1 | 4/2012 | Yuen et al. |
| 2014/0020445 A1* | 1/2014 | Waters .................. G01D 18/00 73/1.75 |
| 2014/0114624 A1 | 4/2014 | Buchanan et al. |
| 2015/0192414 A1 | 7/2015 | Das et al. |
| 2015/0241213 A1 | 8/2015 | Garin et al. |
| 2016/0192864 A1 | 7/2016 | Booij et al. |
| 2016/0320186 A1* | 11/2016 | Tanabe ..................... G01C 5/06 |

FOREIGN PATENT DOCUMENTS

| | | | |
|---|---|---|---|
| JP | 4915884 | * | 2/2012 |
| WO | 2015098706 A1 | | 7/2015 |

* cited by examiner

ADAPTIVE PRESSURE SENSOR SAMPLING RATE

BACKGROUND

A mobile device (such as a cellular telephone, a smart phone, a tablet computer, a laptop computer, a wearable computer, a navigation and/or tracking device, etc.) may be enabled to receive location-based services through the use of location determination technology including satellite positioning systems (SPS), indoor location determination technologies and/or the like.

For indoor navigation applications, positioning techniques may further determine an altitude of a mobile device, which can be particularly useful in navigating multi-level environments such as buildings in which one or more floors are directly above or below another floor. To this end, mobile devices can use barometric pressure sensors to determine when the mobile device transitions between floors in a building. But changes in the weather that alter atmospheric pressure can make readings from these sensors less reliable. Current techniques for accommodating weather changes often involve causing the barometric pressure sensor to take measurements continuously, which can consume a lot of power in a mobile device.

SUMMARY

Techniques provided herein are directed toward adjusting the rate at which a mobile device's barometric pressure sensor takes measurements, based on whether movement is detected from motion sensors, such as accelerometers, gyroscopes, and the like. Where movement is below a threshold (e.g., within a threshold distance), then the barometric pressure sensor can reduce the sampling rate to a rate that still enables the mobile device to account for changes in the weather. If movement is detected (e.g., greater than a threshold distance), then the sampling rate of the barometric pressure sensor increases (i.e., to a normal rate for determining vertical movement changes).

A mobile device, according to the disclosure, can comprise a barometric pressure sensor, one or more motion sensors configured to measure movement of the mobile device, a processing unit communicatively coupled with the barometric pressure sensor and the one or more motion sensors. The processing unit can be configured to: in response to determining, with the one or more motion sensors, that the mobile device has moved below a threshold distance, operate the barometric pressure sensor at a first sampling rate. The processing unit can further be configured to calibrate the barometric pressure sensor to compensate for a change in atmospheric pressure sensed by the barometric pressure sensor while the barometric pressure sensor operates at the first sampling rate, and in response to determining, with the one or more motion sensors, that the mobile device has moved above the threshold distance, operate the barometric pressure sensor at a second sampling rate greater than the first sampling rate.

The mobile device can include one or more of the following features. The processing unit may be configured to use a first filter and a second filter to estimate a barometric pressure based on data received by the barometric pressure sensor, where, for a given length of time, a first component of the estimate of the barometric pressure provided by the first filter changes at a rate slower than a second component of the estimate of the barometric pressure provided by the second filter. The processing unit may be configured to disable the second filter while the barometric pressure sensor is operating at the first sampling rate. The first component of the estimate of the barometric pressure provided by the first filter may be indicative of weather effects on the barometric pressure and the second component of the estimate of the barometric pressure provided by the second filter may be indicative of altitude effects on the barometric pressure. The mobile device may further comprise a wireless communication interface, where the determining that the mobile device has moved may be further based on information received by the wireless communication interface. The information received by the wireless communication interface may include an identity of one or more wireless beacons. The information received by the wireless communication interface may comprise at least one of round trip time (RTT) measurement information, received signal strength indication (RSSI) measurement information, angle of arrival (AOA) measurement information, or any combination thereof. The processing unit may be configured to cause the barometric pressure sensor to operate at the first sampling rate or the second sampling rate based on at least one of a current location of the mobile device, historical information, or any combination thereof. The mobile device may further comprise a wireless communication interface, where the processing unit is further configured to provide, via wireless communication to a second mobile device, information indicative of data collected while the barometric pressure sensor operates at the second sampling rate. The processing unit may be configured to determine a period of time in which the second mobile device was not collecting barometric pressure sensor information, and the information indicative of data collected while the barometric pressure sensor operates at the second sampling rate may include information regarding data collected during the period of time in which the second mobile device was not collecting barometric pressure sensor information. The processing unit may be configured to determine that the mobile device has moved below the threshold distance by determining that the mobile device has not moved for a certain period of time. The one or more motion sensors may operate to provide pedestrian dead reckoning (PDR); and the determining with the one or more motion sensors, that the mobile device has moved above a threshold distance is based, at least in part, on an output of the PDR.

An example method of adjusting a sampling rate in a barometric pressure sensor of a mobile device, according to the disclosure, comprises in response to determining, with one or more motion sensors of the mobile device, that the mobile device has moved below a threshold distance, operating the barometric pressure sensor at a first sampling rate. The method further comprises calibrating the barometric pressure sensor to compensate for a change in atmospheric pressure sensed by the barometric pressure sensor while the barometric pressure sensor operates at the first sampling rate, and in response to determining, with the one or more motion sensors of the mobile device, that the mobile device has moved above the threshold distance, operating the barometric pressure sensor at a second sampling rate greater than the first sampling rate.

The method can include one or more of the following features. The method may further comprise using a first filter and a second filter to estimate a barometric pressure based on data received by the barometric pressure sensor, wherein, for a given length of time, a first component of the estimate of the barometric pressure provided by the first filter changes at a rate slower than a second component of the estimate of the barometric pressure provided by the second filter. The method may further comprise disabling the second filter while the barometric pressure sensor is operating at the first sampling rate. The determining that the mobile device has moved may be further based on information received by a wireless communication interface of the mobile device. The information received by the wireless communication interface may include an identity of one or more wireless beacons. The information received by the wireless communication interface can comprise at least one of round trip time (RTT) measurement information, received signal strength indication (RSSI) measurement information, angle of arrival (AOA) measurement information, or any combination thereof. The method may further comprise causing the barometric pressure sensor to operate at the first sampling rate or the second sampling rate based on at least one of a current location of the mobile device, historical information, or any combination thereof. The method may further comprise providing, via wireless communication from the mobile device to a second mobile device, information indicative of data collected while the barometric pressure sensor operates at the second sampling rate. The method may further comprise determining a period of time in which the second mobile device was not collecting barometric pressure sensor information, wherein the information indicative of data collected while the barometric pressure sensor operates at the second sampling rate includes information regarding data collected during the period of time in which the second mobile device was not collecting barometric pressure sensor information. The method may further comprise determining that the mobile device has moved below the threshold distance by determining that the mobile device has not moved for a certain period of time. The one or more motion sensors may operate to provide pedestrian dead reckoning (PDR); and determining, with the one or more motion sensors, that the mobile device has moved above a threshold distance may be based, at least in part, on an output of the PDR.

An example apparatus, according to the disclosure, comprises means for, in response to determining that the apparatus has moved below a threshold distance, operating barometric pressure sensing means at a first sampling rate. The apparatus further comprises means for calibrating the barometric pressure sensing means to compensate for a change in atmospheric pressure sensed by the barometric pressure sensing means while the barometric pressure sensing means operates at the first sampling rate, and means for, in response to determining that the apparatus has moved above the threshold distance, operating the barometric pressure sensing means at a second sampling rate greater than the first sampling rate.

The apparatus can comprise one or more of the following features. The apparatus may further comprise means for using a first filtering means and a second filtering means to estimate a barometric pressure based on data received by the barometric pressure sensing means, wherein, for a given length of time, a first component of the estimate of the barometric pressure provided by the first filtering means changes at a rate slower than a second component of the estimate of the barometric pressure provided by the second filtering means. The determining that the apparatus has moved may be further based on information received by wireless communication means of the apparatus. The apparatus may further comprise means for causing the barometric pressure sensing means to operate at the first sampling rate or the second sampling rate based on at least one of a current location of the apparatus, historical information, or any combination thereof. The apparatus may further comprise means for providing, via wireless communication from the apparatus to a second apparatus, information indicative of data collected while the barometric pressure sensing means operates at the second sampling rate. The apparatus may further comprise means for determining a period of time in which the second apparatus was not collecting barometric pressure information, wherein the information indicative of data collected while the barometric pressure sensing means operates at the second sampling rate may include information regarding data collected during the period of time in which the second apparatus was not collecting barometric pressure information.

A non-transitory computer-readable medium having instructions embedded thereon for adjusting a sampling rate in a barometric pressure sensor of a mobile device, the instructions comprising computer code for: in response to determining, with one or more motion sensors of the mobile device, that the mobile device has moved below a threshold distance, operating the barometric pressure sensor at a first sampling rate. The instructions may further comprise computer code for calibrating the barometric pressure sensor to compensate for a change in atmospheric pressure sensed by the barometric pressure sensor while the barometric pressure sensor operates at the first sampling rate, and in response to determining, with the one or more motion sensors of the mobile device, that the mobile device has moved above the threshold distance, operating the barometric pressure sensor at a second sampling rate greater than the first sampling rate.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Various example techniques are provided herein which may be implemented at a mobile device to support positioning capabilities, at least in part, by allowing the mobile device to dynamically adjust sampling of a local barometric pressure sensor in accordance to the determined to needs of the mobile device.

As described in greater detail herein, in certain example implementations a mobile device may obtain one or more electrical signals representing one or more (local) barometric pressure measurements. For example, a mobile device may comprise a barometric sensor and/or other like circuitry capable of generating one or more electrical signals responsive to changes in a barometric pressure of an atmosphere surrounding the mobile device. According to some embodiments, an electrical signal representing a barometric pressure measurement may be indicative of a sensed barometric pressure. However, in other embodiments, an electrical signal representing a barometric pressure measurement may comprise data from a sensor (e.g., raw data, etc.) that may be processed (e.g., by a processing unit and/or other circuitry within the mobile device using known techniques applicable to the sensor) to be indicative of a sensed barometric pressure.

Barometric pressure may change overtime as a result of changes in atmospheric weather conditions and/or as a result of changes in an altitude of the mobile device within the atmosphere. Accordingly, in certain instances, one or more of the electrical signals representing one or more barometric pressure measurements may be indicative of contributions relating to a weather effect and an altitude effect. These barometric pressure measurements can be utilized by a mobile device or a positioning system in order to determine a position of the mobile device. Techniques described herein enable a mobile device to accommodate changes in barometric pressure measurements due to weather effects (which would otherwise affect the accuracy of an estimation of the mobile device's altitude) while dynamically adjusting the rate at which barometric pressure measurements are taken to increase battery life and efficiency of the mobile device.

Figure 1:
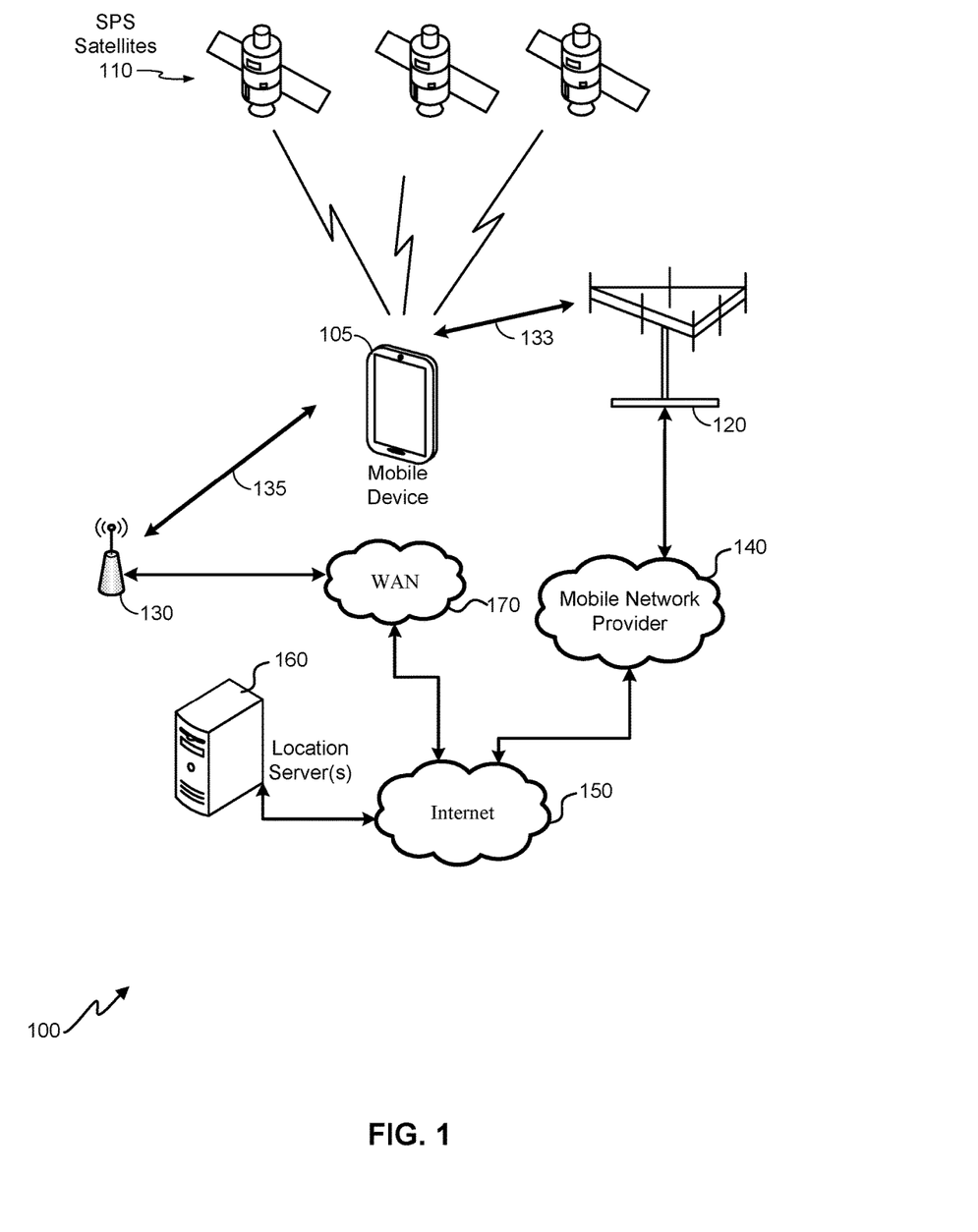
FIG. 1 is a simplified illustration of a positioning system, according to an embodiment.

FIG. 1 is a simplified illustration of a positioning system 100 in which a mobile device 105 and/or other components of the positioning system 100 can process measurements (such as barometric pressure measurements) and/or other data points to determine the position of the mobile device 105. The techniques described herein may therefore be implemented by one or more components of the positioning system 100. The positioning system can include a mobile device 105, satellite positioning service (SPS) satellite vehicles (SVs) 110, base transceiver station(s) 120, mobile network provider 140, access point(s) (AP(s)) 130, location server(s) 160, wireless area network (WAN) 170, and the Internet 150. It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may be utilized in the positioning system 100. Similarly, the positioning system 100 may include many antennas 120 and/or APs 130. The illustrated connections that connect the various components in the positioning system 100 comprise data connections which may include additional (intermediary) components, direct or indirect connections, and/or additional networks. Furthermore, components may be rearranged, combined, separated, substituted, and/or omitted, depending on desired functionality. A person of ordinary skill in the art will recognize many modifications to the components illustrated.

The antenna 120 is communicatively coupled to the mobile network provider 140 which may be communicatively coupled with the Internet 150. In some embodiments, the antenna 120 may comprise a base station of a cellular network, which may employ any of a variety of wireless technologies, as described herein below with regard to FIG. 8. The location server(s) 160 can also be communicatively coupled with the Internet 150. Thus, the mobile device 105 can communicate information with the location server(s) 160, for example, by accessing the Internet 150 via the antenna 120 using a first communication link 133. Additionally or alternatively, because an AP 130 and WAN 170 also may be communicatively coupled with the Internet 150, the mobile device 105 may communicate with the location server(s) 160 using a second communication link 135.

Figure 2:
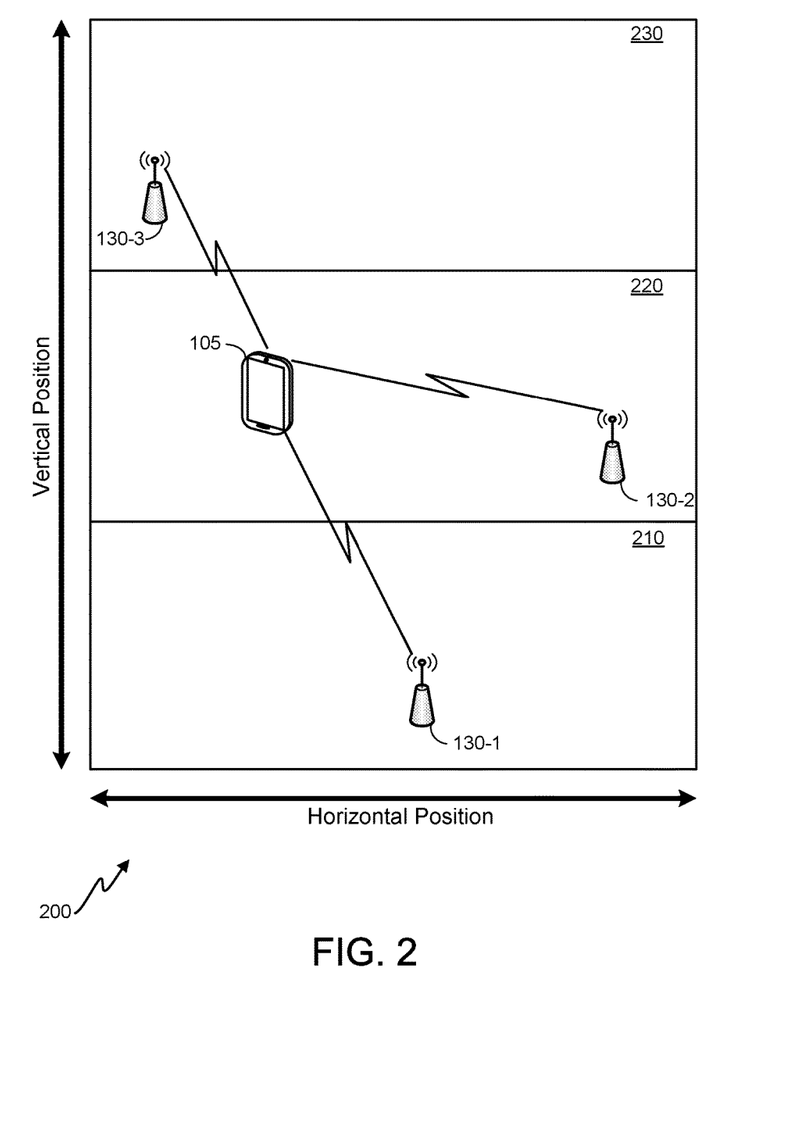
FIG. 2 is a simplified illustration of a multi-level environment, according to one embodiment.

Depending on desired functionality, a location of the mobile device 105 can be determined in any of a variety of ways, by the mobile device and/or other devices in communication with the mobile device, which may be situation dependent. In some embodiments, the location server(s) 160 and/or other devices (not shown) remote to the mobile device 105, for example, can be used to implement positioning methods for supporting the positioning of a mobile device 105, typically referred to as a target mobile device, target device, or target. These positioning methods may comprise, for example, measurements by a mobile device of signals transmitted by SPS SVs 110, antennas 120 belonging to a wireless cellular network (e.g., the mobile network provider 140), a access points (APs) 130, and the like. These positioning methods may also include receiving measurements from sensors of the mobile device 105, such as one or more gyroscopes, accelerometers, magnetometers, barometric pressure sensors, and/or the like. FIG. 2 illustrates how barometric pressure sensors may be beneficial in positioning systems such as the positioning system 100 of FIG. 100.

FIG. 2 is a simplified illustration of a multilevel environment 200, according to one embodiment. The multilevel environment 200 can comprise any of a variety of structures, such as an office building, residential building, and/or the like. Here, the multilevel environment 200 has lower, middle, and upper floors (210, 220, and 230, respectively). However, it will be understood that a multilevel environment 200 may include a larger or smaller number of floors (or other types of levels). Additionally, although several APs 130 are shown, there may be instances in which a multilevel environment 200 has a larger or smaller number of APs 130. In some instances, for example, no APs 130 may be present in a multilevel environment 200.

A positioning system (such as the positioning system 100 of FIG. 1) may utilize information from APs 130 and mobile device 105 to determine a position of the mobile device 105. (This position can comprise a 3D position that includes altitude/elevation.). As indicated previously, measurements may be taken with regard to a distance between the mobile device 105 and the APs 130. These measurements can include received signal strength (RSSI), a round trip time (RTT), an angle of arrival (AOA), and/or the like. In some instances, however, these measurements may be insufficient to enable a positioning system to determine and accurate or correct estimation of vertical position. For example, RSSI measurements through structures such as ceilings, floors, walls, and/or the like may be inaccurate, or the mobile device 105 may not be able to communicate with a sufficient number of APs 130 to perform trilateration or other position estimation calculation techniques. (In FIG. 2, for example, the mobile device 105 may determine that it is closer to an AP 130-3 on the upper floor 230 then it is to the AP 130-2 on the middle floor 220 or the AP 130-1 on the lower floor 210. It may therefore be unclear to the positioning system whether the mobile device 105 is on the middle floor 220 or the upper floor 230.)

To aid in the process of determining an accurate vertical position of the mobile device 105 in a multilevel environment 200, a positioning system may employ barometric pressure measurements, which can facilitate the determination of a vertical position of the mobile device 105. Traditional solutions for utilizing barometric pressure measurements included positioning a fixed device on each level of a multilevel environment 200 to determine a barometric pressure of the level. A mobile device 105 could also include a barometric pressure sensor, and the data from the barometric pressure sensor of the mobile device 105 could be compared (e.g., by the mobile device or another device within the positioning system) with the barometric pressure measurements of the fixed devices to determine the level on which the mobile device 105 is located. Problematically, however, implementing these solutions can be difficult because locating a device on each level with a barometric pressure sensor can be costly and time consuming.

According to techniques described herein, a positioning system may utilize a barometric pressure sensor of the mobile device 105 without the need for separate barometric pressure sensors on each level of the multilevel environment 200. To do so, the mobile device 105 can ensure that its barometric pressure sensor readings remain accurate by continually obtaining barometric pressure sensor readings and compensating for alterations in those readings due to weather effects. The mobile device 105 can further dynamically adjust the rate at which barometric pressure sensor readings are sampled in order to ensure power savings. The following description details how weather fix can be compensated for and how a reduced sampling rate can be utilized.

Figure 3A:
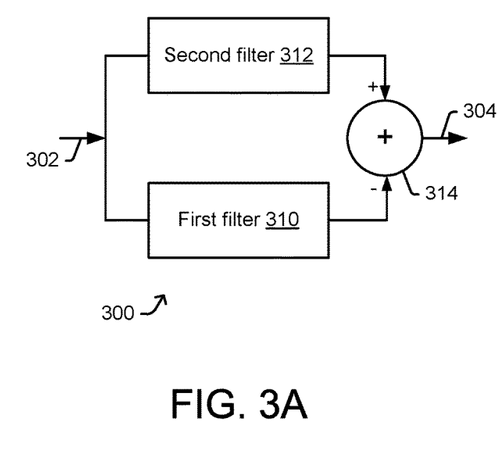
FIGS. 3A and 3B are schematic diagrams illustrating certain example filter arrangements that may compensate for weather effects detected by a barometric pressure sensor.
Figure 3B:
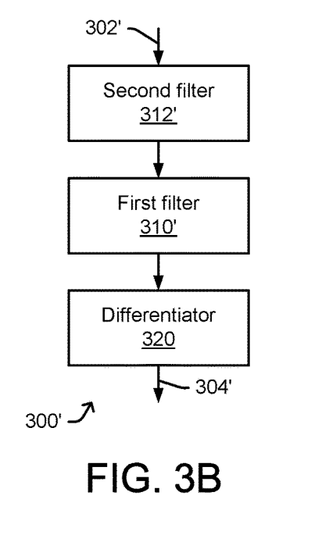
Figure 8:
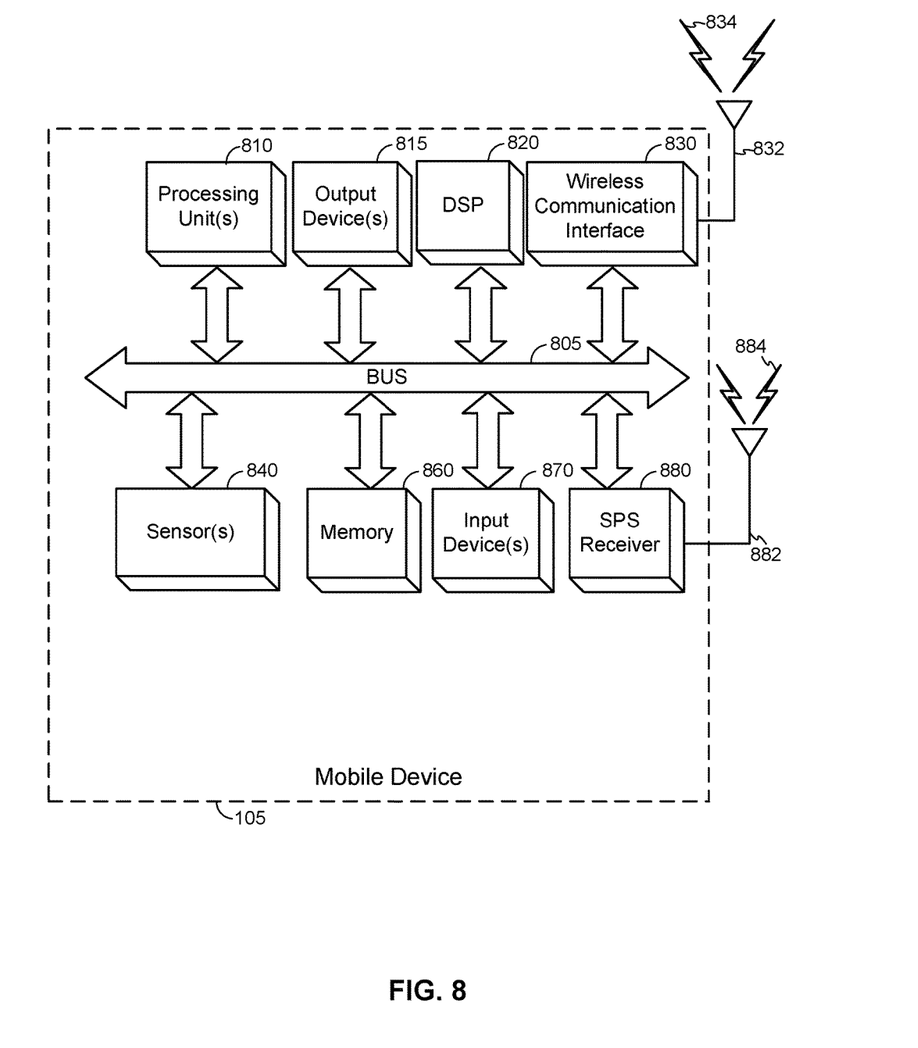
FIG. 8 is a block diagram an embodiment of a mobile device 105, which can be utilized as described herein above.

FIGS. 3A and 3B are schematic diagrams illustrating certain example filter arrangements 300 and 300', respectively, that may be implemented in mobile device 105 and/or other devices to compensate for weather effects detected by a barometric pressure sensor. A person of ordinary skill in the art will appreciate that the components illustrated in these figures can be implemented in a variety of fashions, including hardware and/or software means. For example, components may be implemented in hardware through the use of one or more integrated circuits (e.g., digital signal processor (DSP) units, ASICs, etc.) and/or software (e.g., that may be executed by a general purpose processing unit). An embodiment of such hardware and/or software components is shown in FIG. 8 and described below.

Example filter arrangement 300 comprises a first filter 310 and a second filter 312 illustratively arranged in parallel, each of which may be provided with a signal at an input 302 representing a barometric pressure measurement, which may be impacted by both weather effects and altitude effects (vertical movement). First filter 310 may be more sensitive to relatively fast changes in barometric pressure sensor readings due to altitude effects. The first filter 310 may therefore utilize a relatively high sampling rate of the barometric pressure sensor. (In some embodiments, for example, the sampling rate of the barometric pressure sensor used by the first filter 310 can be one or more times per second. Other embodiments may have a sampling rate lower than these embodiments.) Because the first filter 310 is more sensitive to relatively fast changes in the barometric pressure sensor readings, this means that, for a given length of time, an estimate of the barometric pressure of the first filter 310 changes at a rate faster than the estimate of the barometric pressure of the second filter. The first filter 310 can, for example, work directly on pressure measurements or altitudes obtained by employing a standard equation on the pressure measurements (as shown by equation (1), discussed below).

Second filter 312 may be more sensitive to relatively slow changes in barometric pressure sensor readings due to weather effects. Although the second filter 312 may utilize the faster sampling rate of the first filter 310, the second filter 312 may also operate using a relatively slow sampling rate of the barometric pressure sensor. (In some embodiments, for example, the sampling rate of the barometric pressure sensor used by the first filter 310 can be once every 10 seconds, 100 seconds, or more. Other embodiments may have a sampling rate faster than this.) As shown, at an output 304 a difference may be provided between the output of the first and second filters may be obtained using an adder 314 and/or the like as illustrated. As mentioned, such a difference may be compared to a threshold value, e.g., to determine whether mobile device 105 is transitioning or has transitioned from an initial level (e.g., floor or story) to another level of a multi-level structure.

Example filter arrangement 300' comprises a second filter 312' and a first filter 310' illustratively arranged in series, wherein second filter 312' may be provided, at an input 302'. As with input 302 in FIG. 3A, input 302' may be indicative of changes in barometric pressure due to both weather effects and altitude effects (vertical movement). Second filter 312' may determine an output corresponding to the weather effect. First filter 310' may determine an output corresponding to the altitude effect. As shown, an output 304' of the difference between the first and second outputs may be obtained using a differentiator 320 and/or the like as illustrated.

In certain example implementations, first filter 310/310' may comprise a Kalman filter (KF), a recursive least squares filter, a particle filter, and/or the like, and second filter 312/312' may comprise an exponential moving average (EMA) filter, a recursive least squares filter, a particle filter, and/or the like. In certain instances, the first and second outputs may be indicative of applicable barometric pressures and/or corresponding estimated altitudes, vertical offsets, etc. A Kalman filter and/or the like may, for example, respond more quickly to transitions of the mobile device 105 between levels than the EMA filter and/or the like. Monitoring a difference between the first and second outputs may allow detection of ongoing or completed transitions between levels of a structure. By way of an example, in certain instances a threshold value indicating a difference of 3.0 m (or corresponding barometric pressure difference, etc.) may be applied to determine whether a transition may be occurring or may have occurred. For example, if the first outputs corresponds to estimated altitude that is more than a threshold 3.0 m higher than an estimated altitude corresponding to the second output, it may be inferred that the position of the mobile device has transitioned to a higher altitude or level. Likewise, if the first output corresponds to an estimated altitude is more than 3.0 m lower than an estimated altitude corresponding to the second output, it may be inferred that the location of the mobile device has transitioned to a lower altitude or level.

By way of example, an EMA filter may be implemented as follows:

$$h_k = \alpha Z_k + (1-\alpha) h_{k-1} \quad (1)$$

Where $Z_k$ is a current observation of barometric pressure or altitude based on a current barometric pressure measurement; $h_k$ is the $k^{th}$ EMA estimate of altitude; and $\alpha$ represents a weight applied to the current observation. By way of example, in certain instances a default value for α may be set to 0.0001.

Because the second filter can continue to determine changes in barometric pressure sensor readings due to weather effects when the barometric pressure sensor is operating at a reduced sampling rate, embodiments can dynamically adjust the sampling rate of the barometric pressure sensor to reduce the sampling rate when movement of the mobile device is limited, which can increase battery life of the mobile device by increasing power savings.

Figure 4:
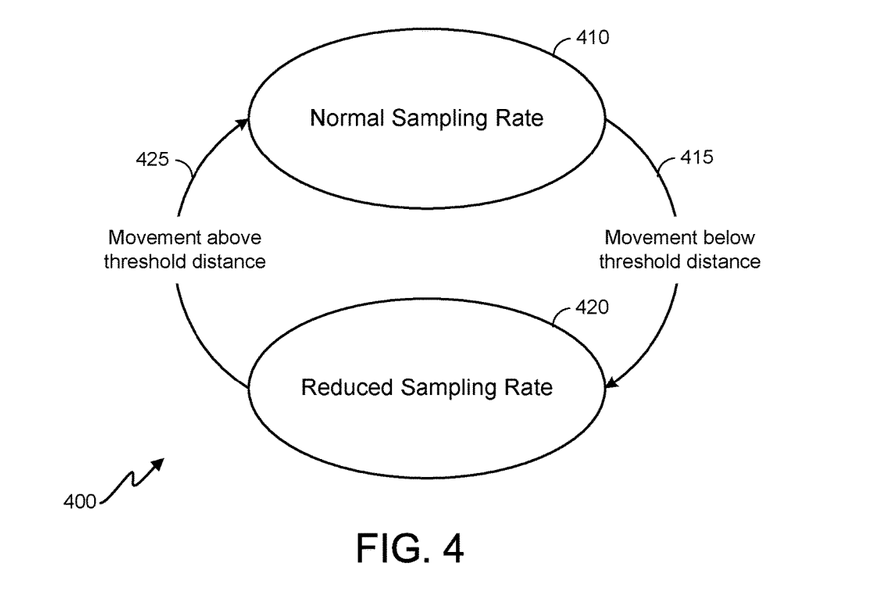
FIG. 4 is a diagram of a state machine that illustrates an embodiment of how a mobile device (such as the mobile device of FIGS. 1 and 2) can dynamically adjust the sampling rate of the barometric pressure sensor.

FIG. 4 is a diagram of a state machine 400 that illustrates an embodiment of how a mobile device (such as the mobile device 105 of FIGS. 1 and 2) can dynamically adjust the sampling rate of the barometric pressure sensor. It will be understood that alternative embodiments may employ additional or alternative states or triggers, depending on desired functionality. Alternative embodiments may also have alternative initial states. A person of ordinary skill in the art will recognize many other variations.

At state 410, a mobile device causes of barometric pressure sensor to operate at a "normal" sampling rate. Here, a "normal" sampling rate means a sampling rate sufficient to enable determination of vertical movement by the mobile device. (This sampling rate is faster (or "higher") than the reduced sampling rate of state 420.) In some embodiments, for example, a "normal" sampling rate is a sampling rate sufficient to enable a first filter (such as the first filter 310 or first filter 310' of FIG. 3A or 3B, respectively) to determine changes in barometric pressure sensor readings due to altitude effects. As indicated above, in some embodiments, the sampling rate may be once or more every second. (Although other embodiments may have a "normal" sampling rate slower than this.)

The mobile device can utilize movement sensors to determine whether or not to remain in the normal sampling rate state 410. These movement sensors (such as accelerometers, gyroscopes, cameras, and/or the like) can be used by the mobile device (and/or other devices) to determine whether the mobile device has moved below a threshold distance during a certain period of time. As indicated elsewhere herein, other sensors may be utilized to measure movement by way of wireless signals and/or other means.

When the mobile device has moved below the threshold distance, it can be indicative that the mobile device will not undergo any significant changes in altitude (and therefore the mobile devices barometric pressure sensor does not need to sample at a rate sufficient to determine vertical movement). That is, when a mobile device is relatively stationary (such as on a user's desk or in a user's pocket while the user is sitting), the mobile device is not likely to undergo significant vertical movement such as a change in level in a multi-level environment. Similarly, when a mobile device has moved less than a threshold distance (such as from a user's desk to a user's pocket) than mobile device has undergone only local movement and is also not likely to undergo significant vertical movement. Thus, the trigger 415 that causes a change from the normal sampling rate state 410 to a reduced sampling rate state 420 is that movement of the mobile device (e.g., as determined from the mobile device's motion sensors) is below a threshold distance. In some embodiments, the trigger 415 may be caused by movement of the mobile device below a threshold speed.

The reduced sampling rate state 420 is a state in which the mobile device operates its barometric pressure sensor at a reduced rate such that the mobile device can continue to compensate for changes in barometric pressure sensor readings due to weather effects, but may not necessarily operate at a rate sufficient to determine vertical movement of the mobile device. In some embodiments, the reduced sampling rate is a sampling rate in which a second filter (such as second filters 312 or 312' of FIGS. 3A and 3B, respectively) can determine changes in the weather effect. As noted above, the sampling rate may be once every 10 seconds, 100 seconds, or longer, although other embodiments may operate at a reduced sampling rate faster than this.

The mobile device can continue to operate in the reduced sampling rate state 420, sampling the barometric pressure sensor readings at a rate sufficient to compensate for weather effects until it receives a trigger 425 to return to the normal sampling rate. Here, the trigger 425 is the detection of the mobile device's movement above the threshold distance. Optionally, in embodiments where speed is a trigger (as noted above), the trigger 425 may also be caused by detection of the mobile device's movement above the threshold speed. An example of such a movement is when a user, with the mobile device in the user's pocket, begins walking away from a desk after having sat at the desk for a certain period of time (during which the mobile device operated in the reduced sampling rate state 420).

It can be acknowledged that alternative embodiments may include additional states. In some embodiments, for example, there may be several reduced sampling rate states that provide a "sliding scale" of reduced sampling based on determined movement. That is, the slower and/or smaller the detected movement, the slower the sampling rate. Conversely, the faster and/or larger the detected movement, the faster the sampling rate. This "sliding scale" not only could be implemented by having several tiers of sampling rates (such as three different sampling rates, five different sampling rates, and so on), but may be alternatively implemented by providing a mathematical algorithm that directly ties a sampling rates to a determined movement value. In that case a movement value may be indicative of an amount of movement (e.g., as measured by movement sensors of the mobile device), and a sampling rate could be calculated based on the movement value. The sampling rate would be directly or inversely proportional to the movement value, depending on whether the movement value is directly or inversely proportional to the amount of movement detected by the mobile device. (For example, if a larger movement value is indicative of more movement by the mobile device, then the sampling rate would be directly proportional to the movement value, and a larger movement value would result in a higher sampling rate.)

Additional variations may be implemented, depending on desired functionality. For example, where to filters are utilized to filter barometric pressure sensor input (e.g., in the manner suggested in FIGS. 3A and 3B), a filter utilized to detect altitude effects (e.g., the first filter 310 or 310' of respective FIGS. 3A and 3B) may be disabled when the mobile device is operating at the reduced sampling rate state 420.

Some embodiments may determine whether threshold movement has occurred using additional or alternative functionality. For example, some embodiments may utilize information received by the wireless communication interface to determine whether the mobile device has moved above a threshold speed or distance. In these embodiments, the mobile device may communicate with stationary connected devices (such as connected light fixtures, access points, thermostats, and/or other wireless electrical devices in the Internet of Things (IoT)) to determine whether the mobile device is moving and/or whether or not the movement is vertical. Movement can be determined, for example, by detecting wireless beacons from new devices that were not previously detected by the mobile device (which can occur when the mobile device is moving from one area to another). Movement can additionally or alternatively be determined through the use of measurement data indicative of a distance between the mobile device in one or more of these wireless electrical devices. Measurement data can include, for example, received signal strength (RSSI), a round trip time (RTT), an angle of arrival (AOA), and/or the like. The wireless technologies utilized by these wireless electrical devices may vary. Such technologies may include, for example, Wi-Fi®, Bluetooth®, Bluetooth® low energy (BLE), near-field communication (NFC), ultra wide band (UWB), and/or the like. In addition or as an alternative to the other techniques described herein for determining whether the threshold movement (e.g., a threshold distance) has occurred, an SPS receiver may be used to make this determination (at least in part). FIG. 8 illustrates examples of a wireless communication interface 830 and SPS receiver 880 of a mobile device. Additional description of these components is provided herein below.

Techniques provided herein not only allow devices to preserve power of a mobile device by dynamically adjusting a sampling rate of a barometric pressure sensor, but also enable multiple devices to utilize barometric pressure sensor measurements of a single device. Thus, additional power savings can be achieved.

Figure 5:
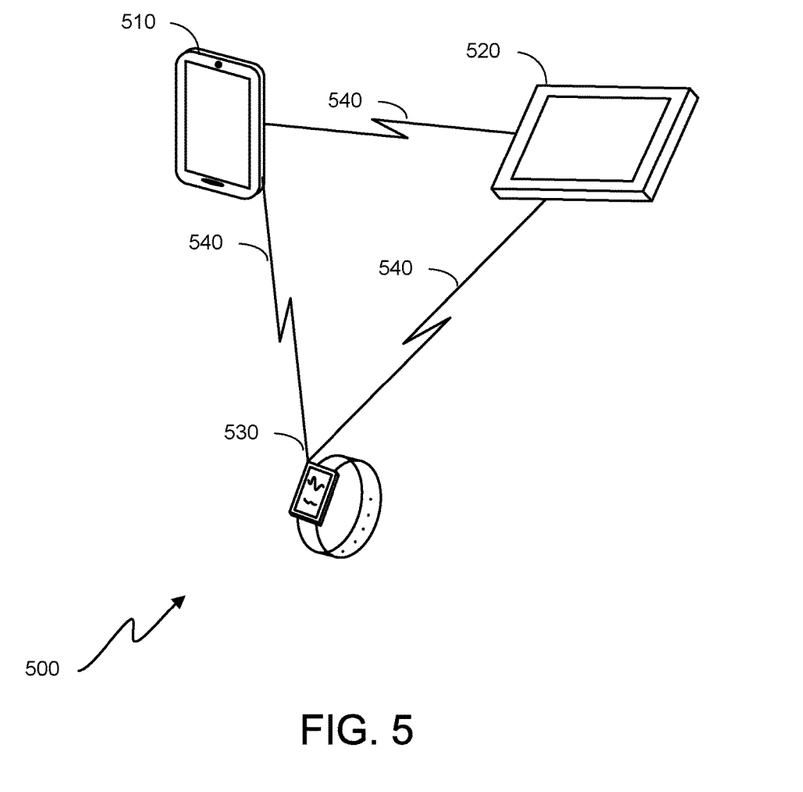
FIG. 5 is a simplified drawing of an embodiment of a personal area network that can provide these additional power savings by sharing barometric pressure sensor measurements among multiple devices.

FIG. 5 is a simplified drawing of an embodiment of a personal area network 500 that can provide these additional power savings by sharing barometric pressure sensor measurements among multiple devices. Here, the mobile devices include a mobile phone 510, tablet 520, and wearable 530 (such as a smart watch, fitness tracker, and/or the like), although a personal area network 500 may comprise additional or alternative devices or device types. Moreover, other types of networks may be utilized to perform the techniques described herein. Generally, a personal area network 500 (or other network) will include a group of devices that are wirelessly connected, mobile, and generally at a common location (e.g., on the same level in a multi-level environment). In some embodiments, the devices may be connected wirelessly via wireless connections 540 and may form a peer-to-peer network. Other network configurations may include a hub-and-spoke configuration, a master/slave configuration, and/or the like.

According to techniques herein, when all or a subset of the devices have determined that the personal area network 500 has or will be moved below a threshold speed or distance, one or more of the devices in the personal area network can enter a low-power state and/or otherwise stop sampling barometric pressure sensor measurements. In the meantime, one of the devices having a barometric pressure sensor can continue to monitor the barometric pressure to determine trends in the barometric pressure sensor measurements due to weather effects. As such, the device can sample its barometric pressure sensor at a reduced rate (e.g., operate at the reduced sampling rate state 420 as illustrated in FIG. 4). When the other devices, enter a normal power state, and/or otherwise start sampling barometric pressure sensor measurements again, they can receive information (such as a rate of change of barometric pressure) from the device that continued to monitor the barometric pressure that enable the devices to accommodate weather effects that may have occurred while they were not sampling barometric pressure sensor measurements.

For example, in the personal area network 500 comprising a mobile phone 510, tablet 520, and wearable 530, one or more of the devices may determine that movement has dropped below a threshold distance and/or speed. Accordingly, the mobile phone 510 and the tablet 520 may enter a low-power mode (or other mode in which these devices do not continue to monitor barometric pressure). These devices may send one or more messages to the wearable 530 (via the wireless connections 540) that they will no longer monitor barometric pressure, enabling the wearable 530 to know the approximate time at which it will need to monitor barometric pressure for those devices. The wearable 530 can then continue to monitor barometric pressure to determine changes in the barometric pressure due to weather effects that occur while the mobile phone 510 and the tablet 520 are not monitoring barometric pressure. As such, the wearable 530 can sample the barometric pressure at a relatively low sampling rate (e.g., operate in the reduced sampling rate state 420 of FIG. 4). As the mobile phone 510 and the tablet 520 again begin to monitor barometric pressure they can indicate this to the wearable 530, which can then provide the mobile phone 510 and the tablet 520 with barometric sensor data from the period of time in which these devices were not monitoring barometric pressure, enabling these devices to compensate for alterations in the barometric pressure due to weather effects. In some embodiments where it is clear that a device such as the wearable 530 will continue to monitor barometric pressure, the other devices may (instead of providing the wearable 530 with an indication of when a device is going to stop monitoring barometric pressure) send a message to the wearable 530 indicative of a period of time in which they stopped monitoring barometric pressure. The wearable 530 can then send, in return, barometric pressure sensor data for the period(s) of time during which these devices had stopped monitoring barometric pressure. This barometric pressure sensor data can include, for example, a rate of change of barometric pressure, which can be useful in determining whether effects.

According to some embodiments, history and/or location additionally or alternatively may be used to dynamically adjust a sampling rate of the barometric pressure sensor of the mobile device. Put broadly, a mobile device at or near (e.g., within a threshold distance) locations associated with changes in altitude/elevation by devices in general or by the specific mobile device (as determined via device history) can increase a sample rate of the barometric pressure sensor to more accurately determine whether the mobile device has undergone a change in altitude/elevation.

Figure 6:
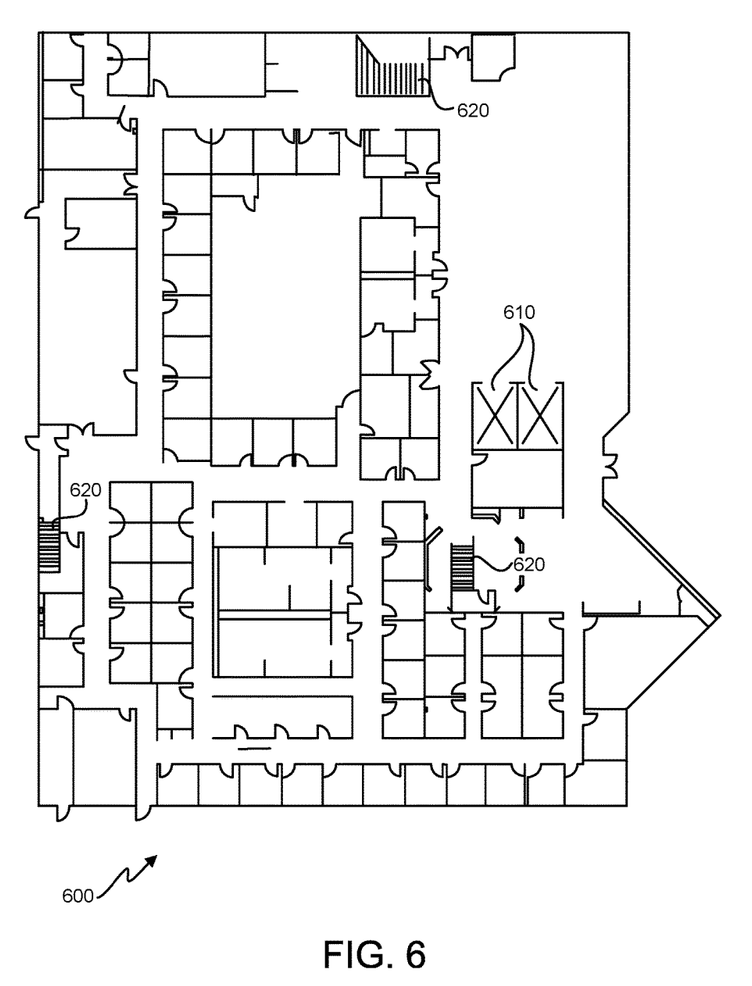
FIG. 6 is an example floorplan that may be utilized by a mobile device to determine how to adjust the sampling rate of a barometric pressure sensor.

FIG. 6 is an example floorplan that may be utilized by a mobile device to determine how to adjust the sampling rate of a barometric pressure sensor. It will be understood that any of a variety of maps and/or map types may be utilized by a mobile device in a similar manner. A positioning system (such as the positioning system 100 of FIG. 1) may be utilized in conjunction with the floorplan 600 to determine a location of a mobile device with respect to the floorplan 600. Crowdsourcing, manual designation by an administrator, and/or other means may be utilized to determine where vertical portals in the floorplan (e.g., elevators, stairs, escalators, and/or the like) are located.

According to some embodiments, a mobile device can determine where, on the floorplan 600, the mobile device is currently located. If the mobile device is not located substantially near (e.g., within a threshold distance) a vertical portal, like the stairs 620 or elevator 610, then the mobile device can operate its barometric pressure sensor at a reduced sampling rate. That is, the mobile device can operate, for example, in the reduced sampling rate state 420 of FIG. 4. When the mobile device determines that it is located substantially near (e.g., within a threshold distance) one of these vertical portals, it can then increase the sampling rate of the barometric pressure sensor (e.g., operate in the normal sampling rate state 410) to help facilitate the detection of changes in altitude/elevation.

Depending on desired functionality, embodiments may employ additional or alternative features. In some embodiments, for example, historical information can be utilized to determine the likelihood that a change in altitude/elevation will take place. For example, if the mobile device (when carried by a user) has historically approached the elevators 610 but has never used them to make a change in altitude/elevation, the mobile device may operate its barometric pressure sensor in a reduced or semi-reduced manner such that the sampling rate does not increase to the speed at which it normally would increase when the mobile device approaches a vertical portal. In other words, the mobile device can, by analyzing historical position data, determine a likelihood that the mobile device will make an altitude/elevation adjustment at a vertical portal and, based on the determined likelihood, alter the sampling rate of the barometric pressure sensor accordingly. Generally speaking, the higher the likelihood that the mobile device will make an adjustment in altitude/elevation, the higher the sampling rate will be to determine whether such an adjustment is made.

According to some embodiments, a mobile device can further determine whether locations include features that may alter pressure sensor readings. In such cases, barometric pressure sensor readings taken at those locations may be de-weighted (given a reduced weight) or disregarded accordingly. For example, if the mobile device is located in an area that is known to have weather effects such as AC vents or pressurization, the mobile device may disregard or de-weight barometric pressure sensor measurements taken while the mobile device is at the location. Alternatively, a mobile device may reset or recalibrate its barometric pressure sensor or corresponding processing circuitry/software (such as the first and second filters illustrated in FIGS. 3A and 3B) when the mobile device determines that it has entered this type of location.

Figure 7:
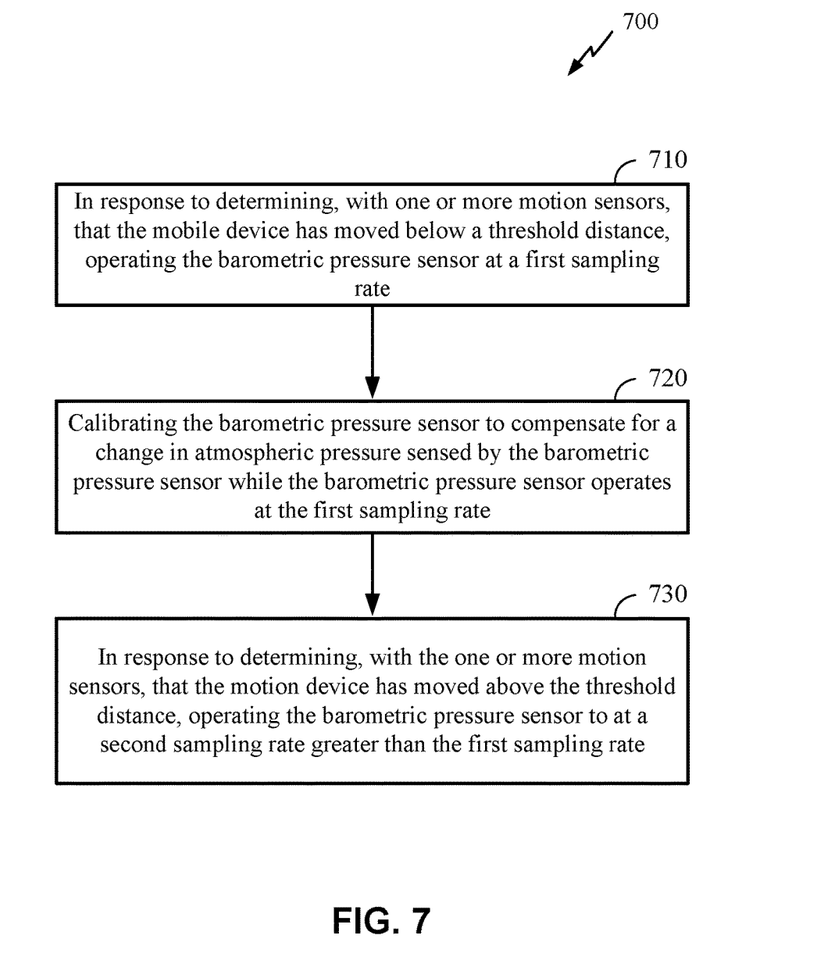
FIG. 7 is a flow diagram of a method of adjusting a sampling rate in a barometric pressure sensor of a mobile device, according to one embodiment.

FIG. 7 is a flow diagram of a method 700 of adjusting a sampling rate in a barometric pressure sensor of a mobile device, according to one embodiment. Means for performing some or all of the blocks illustrated in FIG. 7 may include hardware and/or software components of a mobile device, such as the mobile device illustrated in FIGS. 1 and 2 and described in embodiments throughout this disclosure. Hardware and/or software components of a mobile device are described in further detail with regard to FIG. 8 below. A person of ordinary skill in the art will appreciate that embodiments may combine, separate, rearrange, and/or otherwise alter the blocks of the method 700 as illustrated in FIG. 7.

At block 710, the functionality includes, in response to determining, with one or more motion sensors, that a mobile device has moved below a threshold distance, operating the barometric pressure sensor at a first sampling rate. A threshold distance may be set to allow for local movement of the mobile device that may take place while a user is at a particular location. These types of movements can include, for example, movement of the mobile device from a user's pocket to a desk, from the desk to the user's ear, from the user's pocket to in front of the users face, and the like. Determining that a mobile device has moved below a threshold distance can also include determining that the mobile device has not moved during a certain period of time. In some embodiments, the first sampling rate may correspond with the reduced sampling rate of the reduced sampling rate state 420 illustrated in FIG. 4. In some embodiments, the first sampling rate may be one sample every 10 seconds, 100 seconds, or more, although other embodiments may have a higher sampling rate, depending on desired functionality. As previously indicated, motion sensors can comprise any of a variety of sensors configured to determine a movement of the mobile device. The sensors can include, for example, one or more accelerometers, gyroscopes, magnetometers, cameras, and/or the like. Means for performing the functionality described at block 710 can include, for example, processing unit(s) 810, DSP 820, sensor(s), memory 860, and/or bus 805 of mobile device 105 as described in FIG. 8.

At block 720, the barometric pressure sensor is calibrated to compensate for a change in atmospheric pressure since by the barometric pressure sensor while the barometric pressure sensor operates at the first sampling rate. As described in embodiments provided herein, weather effects can be monitored by barometric pressure sensor measurements taken at the first (reduced) sampling rate. These weather effects can include changes in barometric pressure and/or trends in the change of barometric pressure that can impact future barometric pressure sensor measurements utilized to determine changes in altitude/elevation. As such, these weather effects can be compensated for by the mobile device by way of the calibration of the barometric pressure sensor. Means for performing the functionality described at block 720 can include, for example, processing unit(s) 810, DSP 820, sensor(s), memory 860, and/or bus 805 of mobile device 105 as described in FIG. 8.

The functionality at block 730 comprises, in response to determining, with the one or more motion sensors, that the motion device has moved above the threshold distance, operating the barometric pressure operate at a second sampling rate greater than the first sampling rate. In some embodiments, the second sampling rate can correspond with the normal sampling rate of the normal sampling rate state 410 of FIG. 4. In some embodiments, as previously indicated, the second sampling rate can correspond with a sampling rate determined on a "sliding scale," which may be based on an amount of movement and/or distance detected by the one or more motion sensors. In some embodiments, the second sampling rate can occur at any of a variety of speeds higher than the first sampling rate, including a rate of 1 Hz, 10, Hz, 100 Hz, or more. Means for performing the functionality described at block 720 can include, for example, processing unit(s) 810, DSP 820, sensor(s), memory 860, and/or bus 805 of mobile device 105 as described in FIG. 8.

As previously indicated, embodiments may include any of a variety of alternative features, depending on desired functionality. For example, according to embodiments that utilize a first filter and a second filter where a first component of an estimate of the barometric pressure (e.g., a component indicative of weather effects on the barometric pressure) provided by the first filter changes at a rate slower than a second component of the estimate of the barometric pressure (e.g., indicative of altitude effects on the barometric pressure) provided by the second filter, the second filter may be disabled while the barometric pressure sensor is operating at the first sampling rate. According to some embodiments, a mobile device may comprise a wireless communication interface where the determining that the mobile device has moved is also based on information received by the wireless communication interface. As previously noted, such information can include an identity of one or more wireless beacons and/or at least one of round trip time (RTT) measurement information, received signal strength indication (RSSI) measurement information, angle of arrival (AOA) measurement information, or any combination thereof. Embodiments may further cause the barometric pressure sensor to operate at the first sampling rate or the second sampling rate based on at least one of a current location of the mobile device (e.g., in reference to a map), historical information, or any combination thereof. Additionally, the mobile device may provide information to a second mobile device to enable the second mobile device to stop monitoring barometric pressure sensor measurements for a period of time, during which the mobile device may cause the barometric pressure sensor to operate at the second sampling rate. To that end, the mobile device may be further configured to provide, via wireless communication to a second mobile device, information indicative of data collected while the barometric pressure sensor operates at the second sampling rate. To do so, the mobile device may determine a period of time in which the second mobile device was not collecting barometric pressure sensor information. In such cases, the information indicative of data collected while the barometric pressure sensor Some embodiments may utilize pedestrian dead reckoning (PDR) in determining whether the mobile device has moved above or below the threshold distance. More specifically, the one or more motion sensors can be used to provide PDR (e.g., by detecting an orientation of the mobile device, a number of steps taken, etc.). As such, determining, with the one or more motion sensors, that the mobile device has moved above and/or below the threshold distance (as described in blocks 710 and 730) may be based, at least in part, on an output of the PDR.

FIG. 8 is a block diagram an embodiment of a mobile device 105, which can be utilized as described herein above. For example, the mobile device 105 can be used in the positioning system 100 of FIG. 1, perform some or all of the method 700 of FIG. 7, and/or used as generally described in the embodiments detailed herein. It should be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be disposed at different physical locations.

The mobile device 105 is shown comprising hardware elements that can be electrically coupled via a bus 805 (or may otherwise be in communication, as appropriate). The hardware elements may include a processing unit(s) 810 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 8, some embodiments may have a separate DSP 820, depending on desired functionality. The mobile device 105 also may comprise one or more input devices 870, which may comprise without limitation one or more touch screens, touch pads, microphones, buttons, dials, switches, and/or the like; and one or more output devices 815, which may comprise without limitation, one or more displays, light emitting diodes (LEDs), speakers, and/or the like.

The mobile device 105 might also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi® device, a WiMAX® device, cellular communication circuitry, etc.), and/or the like. The wireless communication interface 830 may permit data (such as wireless beacon information and/or distance measurement information as described in the embodiments herein) to be communicated with a network, wireless access points, computer systems, and/or any other wireless electronic devices described herein, including the devices illustrated in FIG. 5. The communication can be carried out via one or more wireless communication antenna(s) 832 that send and/or receive wireless signals 834.

Depending on desired functionality, the wireless communication interface 830 may comprise separate transceivers to communicate with base transceiver stations (e.g., antenna 120) and other wireless devices and access points. Different data networks may comprise various network types. The wireless communication interface 830 may communicate with a Wireless Wide Area Network (WWAN), which may comprise a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A wireless data network as described herein may comprise a wireless local area network (WLAN) which may be an IEEE 802.11x network, and a wireless personal area network (WPAN) (such as the personal area network 500 of FIG. 5) may comprise a Bluetooth network, an IEEE 802.15x, or some other type of network. The techniques described herein may also be used for any combination of WWAN, WLAN and/or WPAN.

The mobile device 105 can further include sensor(s) 840. Such sensors may comprise, without limitation, one or more accelerometers, gyroscopes, cameras, magnetometers, altimeters (including barometric pressure sensors), microphones, proximity sensors, light sensors, and the like. Some or all of the sensor(s) 840 can be utilized as described herein to determine movement and/or provide barometric pressure sensor measurements. Sensor(s) 840 may be used in additional or alternative manners to facilitate a positioning determination by a positioning system (such as positioning system 100 of FIG. 1) by providing measurements for dead reckoning and/or other features. In some embodiments, sensor(s) 840 can be used to provide the pedestrian dead reckoning (PDR) described in embodiments discussed herein above.

Embodiments of the mobile device may also include SPS receiver 880 capable of receiving signals 884 from one or more SPS SVs (such as SPS SVs 110, of FIG. 1) using an SPS antenna 882. Such positioning can be utilized to complement and/or incorporate the techniques described herein. The SPS receiver 880 can extract a position of the mobile device, using conventional techniques, from SPS SVs of an SPS system, such as Galileo, GLONASS, Compass, Quasi-Zenith Satellite System (QZSS) over Japan, Indian Regional Navigational Satellite System (IRNSS) over India, Beidou over China, and/or the like. Moreover, the SPS receiver 880 can be used various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS. In some embodiments, an SPS system may comprise a Global Navigation Satellite System (GNSS) system.

The mobile device 105 may further include and/or be in communication with a memory 860. The memory 860 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 860 of the mobile device 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the mobile device 105 (and/or a processing unit within a mobile device 105, and/or another device of a positioning system). In an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the memory 860 described above. These instructions might take the form of executable code, which is executable by the mobile device 105 and/or might take the form of source and/or installable code, which, upon compilation and/or installation on the mobile device 105 (e.g., using any of a variety of generally available compilers, installation programs, compression/decompression utilities, etc.), then takes the form of executable code.

The techniques described herein may be implemented by various means depending upon applications according to particular features and/or examples. For example, such methodologies may be implemented in hardware, firmware, and/or combinations thereof, along with software. In a hardware implementation, for example, a processing unit (e.g., processing unit(s) 810) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform, such as the memory 860 of the mobile device 105 shown in FIG. 8. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A mobile device comprising:
   a barometric pressure sensor;
   one or more motion sensors configured to measure movement of the mobile device;
   a processing unit communicatively coupled with the barometric pressure sensor and the one or more motion sensors and configured to:
      in response to determining, with the one or more motion sensors, that the mobile device has moved below a threshold distance, operate the barometric pressure sensor at a first sampling rate;
      calibrate the barometric pressure sensor to compensate for a change in atmospheric pressure sensed by the barometric pressure sensor while the barometric pressure sensor operates at the first sampling rate, and
      in response to determining, with the one or more motion sensors, that the mobile device has moved above the threshold distance, operate the barometric pressure sensor at a second sampling rate greater than the first sampling rate; and
   a first filter and a second filter, wherein the processing unit is configured to use the first filter and the second filter to estimate a barometric pressure based on data received by the barometric pressure sensor, and wherein, for a given length of time, a first component of the estimate of the barometric pressure provided by the first filter changes at a rate slower than a second component of the estimate of the barometric pressure provided by the second filter.

2. The mobile device of claim 1, wherein the processing unit is configured to disable the second filter while the barometric pressure sensor is operating at the first sampling rate.

3. The mobile device of claim 1, wherein the first component of the estimate of the barometric pressure provided by the first filter is indicative of weather effects on the barometric pressure and the second component of the estimate of the barometric pressure provided by the second filter is indicative of altitude effects on the barometric pressure.

4. The mobile device of claim 1, further comprising a wireless communication interface, wherein the determining that the mobile device has moved is further based on information received by the wireless communication interface.

5. The mobile device of claim 4, wherein the information received by the wireless communication interface includes an identity of one or more wireless beacons.

6. The mobile device of claim 4, wherein the information received by the wireless communication interface comprises at least one of round trip time (RTT) measurement information, received signal strength indication (RSSI) measurement information, angle of arrival (AOA) measurement information, or any combination thereof.

7. The mobile device of claim 1, wherein the processing unit is configured to cause the barometric pressure sensor to operate at the first sampling rate or the second sampling rate based on at least one of a current location of the mobile device, historical information, or any combination thereof.

8. The mobile device of claim 1, further comprising a wireless communication interface, wherein the processing unit is further configured to provide, via wireless communication to a second mobile device, information indicative of data collected while the barometric pressure sensor operates at the second sampling rate.

9. The mobile device of claim 8, wherein the processing unit is configured to determine a period of time in which the second mobile device was not collecting barometric pressure sensor information, and the information indicative of data collected while the barometric pressure sensor operates at the second sampling rate includes information regarding data collected during the period of time in which the second mobile device was not collecting barometric pressure sensor information.

10. The mobile device of claim 1, wherein the processing unit is configured to determine that the mobile device has moved below the threshold distance based on an amount of movement of the mobile device over a certain period of time.

11. The mobile device of claim 1, wherein:
    the one or more motion sensors operate to provide pedestrian dead reckoning (PDR); and
    the determining, with the one or more motion sensors, that the mobile device has moved above a threshold distance is based, at least in part, on an output of the PDR.

12. A method of adjusting a sampling rate in a barometric pressure sensor of a mobile device, the method comprising:
    in response to determining, with one or more motion sensors of the mobile device, that the mobile device has moved below a threshold distance, operating the barometric pressure sensor at a first sampling rate;
    calibrating the barometric pressure sensor to compensate for a change in atmospheric pressure sensed by the barometric pressure sensor while the barometric pressure sensor operates at the first sampling rate,
    in response to determining, with the one or more motion sensors of the mobile device, that the mobile device has moved above the threshold distance, operating the barometric pressure sensor at a second sampling rate greater than the first sampling rate; and
    using a first filter and a second filter to estimate a barometric pressure based on data received by the barometric pressure sensor, wherein, for a given length of time, a first component of the estimate of the barometric pressure provided by the first filter changes at a rate slower than a second component of the estimate of the barometric pressure provided by the second filter.

13. The method of claim 12, further comprising disabling the second filter while the barometric pressure sensor is operating at the first sampling rate.

14. The method of claim 12, wherein the determining that the mobile device has moved is further based on information received by a wireless communication interface of the mobile device.

15. The method of claim 14, wherein the information received by the wireless communication interface includes an identity of one or more wireless beacons.

16. The method of claim 14, wherein the information received by the wireless communication interface comprises at least one of round trip time (RTT) measurement information, received signal strength indication (RSSI) measurement information, angle of arrival (AOA) measurement information, or any combination thereof.

17. The method of claim 12, further comprising causing the barometric pressure sensor to operate at the first sampling rate or the second sampling rate based on at least one of a current location of the mobile device, historical information, or any combination thereof.

18. The method of claim 12, further comprising providing, via wireless communication from the mobile device to a second mobile device, information indicative of data collected while the barometric pressure sensor operates at the second sampling rate.

19. The method of claim 18, further comprising determining a period of time in which the second mobile device was not collecting barometric pressure sensor information, wherein the information indicative of data collected while the barometric pressure sensor operates at the second sampling rate includes information regarding data collected during the period of time in which the second mobile device was not collecting barometric pressure sensor information.

20. The method of claim 12, further comprising determining that the mobile device has moved below the threshold distance by determining that the mobile device has not moved for a certain period of time.

21. The method of claim 12, wherein:
the one or more motion sensors operate to provide pedestrian dead reckoning (PDR); and
the determining, with the one or more motion sensors, that the mobile device has moved above a threshold distance is based, at least in part, on an output of the PDR.

22. An apparatus comprising:
means for, in response to determining that the apparatus has moved below a threshold distance, operating barometric pressure sensing means at a first sampling rate;
means for calibrating the barometric pressure sensing means to compensate for a change in atmospheric pressure sensed by the barometric pressure sensing means while the barometric pressure sensing means operates at the first sampling rate,
means for, in response to determining that the apparatus has moved above the threshold distance, operating the barometric pressure sensing means at a second sampling rate greater than the first sampling rate; and
means for using a first filtering means and a second filtering means to estimate a barometric pressure based on data received by the barometric pressure sensing means, wherein, for a given length of time, a first component of the estimate of the barometric pressure provided by the first filtering means changes at a rate slower than a second component of the estimate of the barometric pressure provided by the second filtering means.

23. The apparatus of claim 22, wherein the determining that the apparatus has moved is further based on information received by wireless communication means of the apparatus.

24. The apparatus of claim 22, further comprising means for causing the barometric pressure sensing means to operate at the first sampling rate or the second sampling rate based on at least one of a current location of the apparatus, historical information, or any combination thereof.

25. The apparatus of claim 22, further comprising means for providing, via wireless communication from the apparatus to a second apparatus, information indicative of data collected while the barometric pressure sensing means operates at the second sampling rate.

26. The apparatus of claim 25, further comprising means for determining a period of time in which the second apparatus was not collecting barometric pressure information, wherein the information indicative of data collected while the barometric pressure sensing means operates at the second sampling rate includes information regarding data collected during the period of time in which the second apparatus was not collecting barometric pressure information.

27. A non-transitory computer-readable medium having instructions embedded thereon for adjusting a sampling rate in a barometric pressure sensor of a mobile device, the instructions comprising computer code for:
in response to determining, with one or more motion sensors of the mobile device, that the mobile device has moved below a threshold distance, operating the barometric pressure sensor at a first sampling rate;
calibrating the barometric pressure sensor to compensate for a change in atmospheric pressure sensed by the barometric pressure sensor while the barometric pressure sensor operates at the first sampling rate,
in response to determining, with the one or more motion sensors of the mobile device, that the mobile device has moved above the threshold distance, operating the barometric pressure sensor at a second sampling rate greater than the first sampling rate; and
using a first filter and a second filter to estimate a barometric pressure based on data received by the barometric pressure sensor, wherein, for a given length of time, a first component of the estimate of the barometric pressure provided by the first filter changes at a rate slower than a second component of the estimate of the barometric pressure provided by the second filter.

* * * * *